Figure 1:
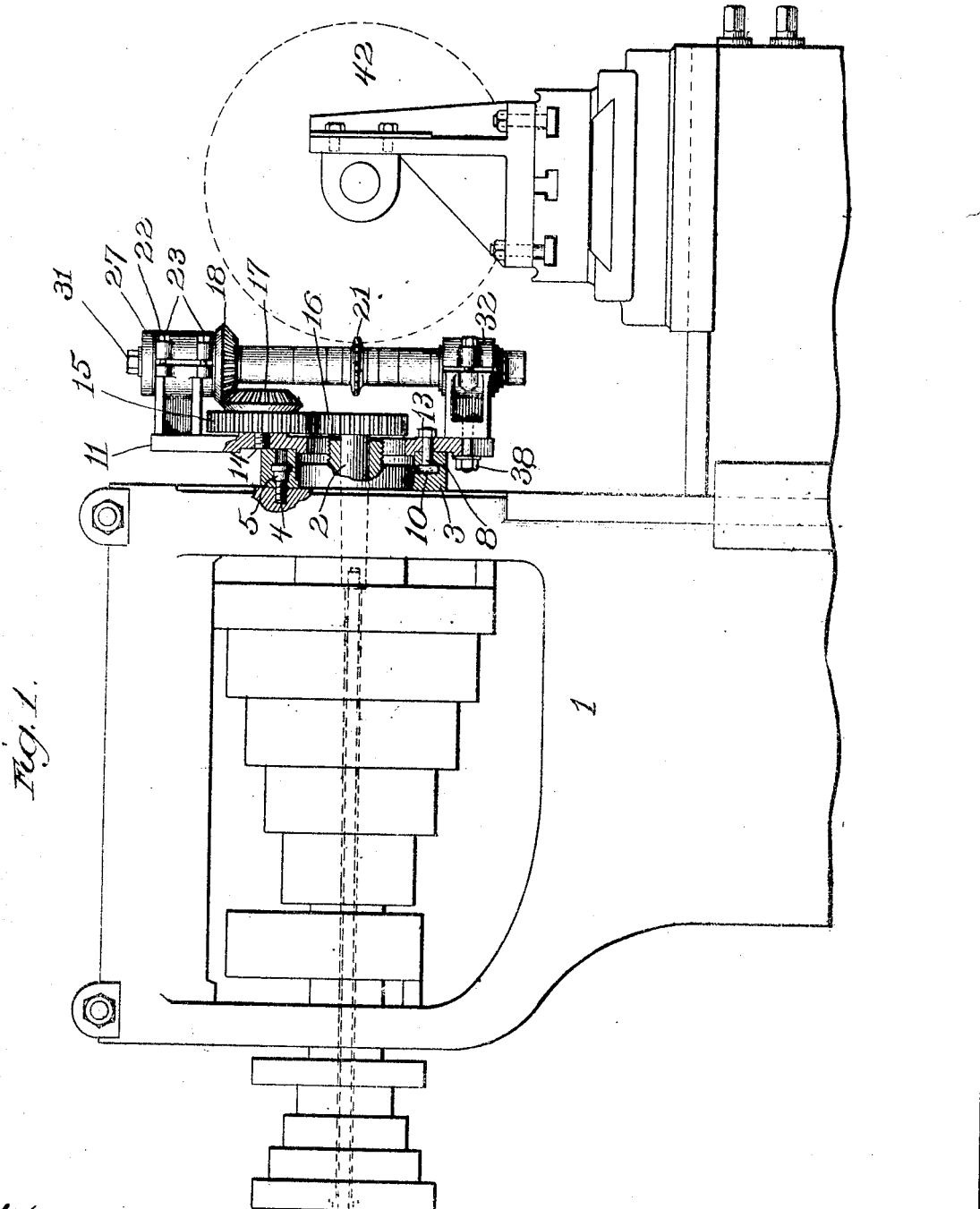

No. 892,810. PATENTED JULY 7, 1908.
N. A. CHRISTENSEN.
GEAR CUTTING MACHINE.
APPLICATION FILED MAY 13, 1901.

3 SHEETS—SHEET 1.

Witnesses:
Harold F. Bartlett.
Louis B. Erwin.

Inventor:
Nels Anton Christensen
By Rector & Hibben
Attys.

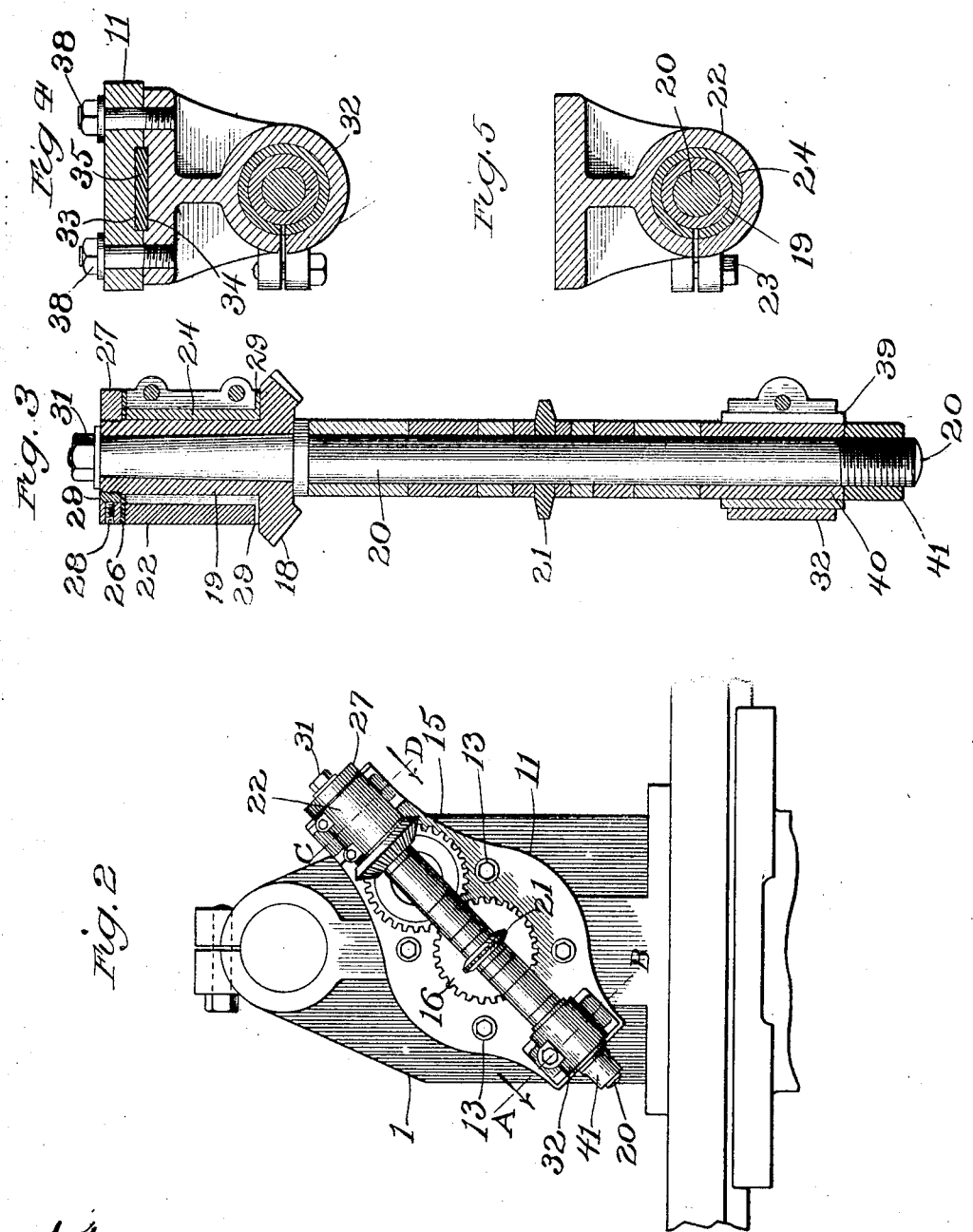

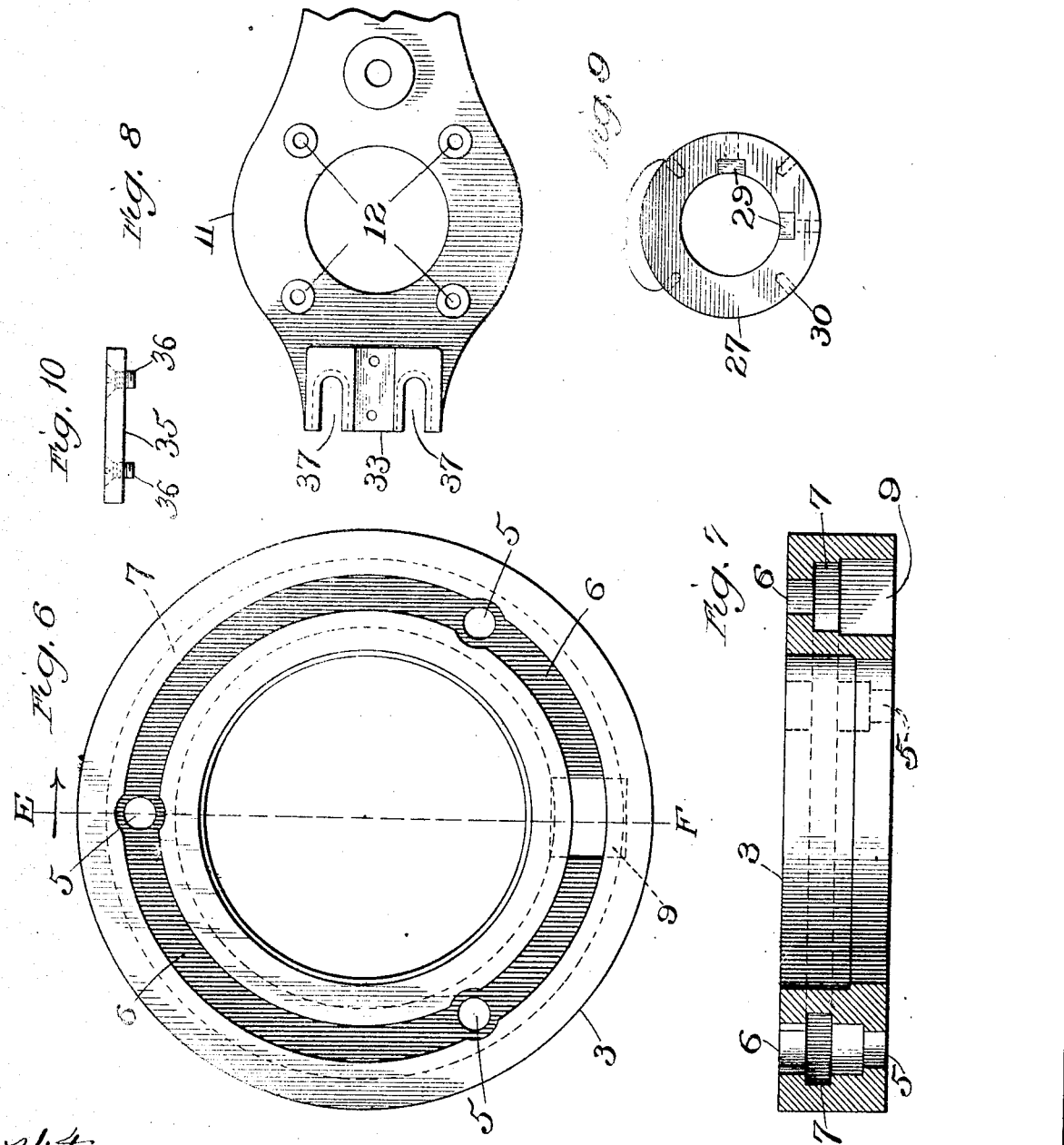

UNITED STATES PATENT OFFICE.

NIELS ANTON CHRISTENSEN, OF MILWAUKEE, WISCONSIN.

GEAR-CUTTING MACHINE.

No. 892,819.

Specification of Letters Patent.

Patented July 7, 1908.

Application filed May 13, 1901. Serial No. 59,966.

*To all whom it may concern:*

Be it known that I, NIELS ANTON CHRISTENSEN, residing at Milwaukee, Milwaukee county, Wisconsin, have invented certain new and useful Improvements in Gear-Cutting Machines, of which the following is a specification.

My invention relates to machines for cutting gears, more especially spiral gears, and consists in providing means whereby spiral gears may be cut in more effective and efficient manner. In the present instance such means comprises an attachment whereby the ordinary universal milling machine, for instance, may be adapted to the cutting of spiral gears, more effective work being rendered thereby mainly by reason of the possibility of using a comparatively short cutter arbor and of getting the work closer to the bearings of the machine.

Other novel features of advantage and utility resulting from the employment of my invention will be apparent from the description herein given.

In the drawings Figure 1 is an elevation of my attachment as applied to a well known form of milling machine, certain of the parts of the attachment being shown in section; Fig. 2 a front elevation of my attachment and a portion of the machine frame; Fig. 3 an enlarged longitudinal section of a cutter arbor and its bearings; Fig. 4 a section on line A—B of Fig. 2; Fig. 5 a section on line C—D of Fig. 2; Fig. 6 an enlarged elevation of the ring or collar 3; Fig. 7 a section on line E—F of Fig. 6; Fig. 8 an elevation of a portion of the swinging frame; Fig. 9 an enlarged elevation of an adjusting collar, and Fig. 10 an edge view of the tongue 35 and its screws 36.

My device or attachment is capable of application to any ordinary universal milling machine, but it is to be understood that my invention is not restricted in scope to any particular construction, or arrangement of machine to which it might be attached or in which it may be employed. My attachment or apparatus is herein shown as applied to and supported by the main frame 1, of a milling machine in which is arranged the usual main spindle 2. A ring or collar 3 is secured to the frame in any suitable manner, and as shown this ring is secured thereto by a series of tap bolts 4 passing through transverse holes 5 therein, three bolts being used in the present instance. This ring has an annular groove 6 communicating with a wider annular interior channel 7, both the groove and channel being described on the same radius as the bolt holes 5, which consequently pass through the bottom of the channel. To provide for the insertion of the special form of bolts 8, preferably used in my construction, the inner face of the ring or collar has an enlarged opening 9 communicating with the channel and of a size to permit the head 10 of these special bolts to pass through.

A swinging frame 11 is provided with a series of holes 12, (four holes in the present instance) to receive the four special bolts 8 which are each passed through the back of the collar and rotated with the swinging frame after being inserted in the holes 12. Nuts 13 on these bolts serve to hold the swinging frame in any position to which it may have been adjusted with reference to the ring or collar and machine generally. In this adjustment or swinging of the frame the heads 10 of the bolts move in the interior channel of the ring or collar, the shanks of the bolts moving in the annular groove, and when the swinging frame and consequently the cutter (hereinafter described) are in the desired set position according to the angle to which the gears are to be cut, such frame is clamped or secured in that position by screwing the nuts 13 tight against such swinging frame. The swinging frame has a stud 14 on which is mounted a gear 15 meshing with another gear 16 secured on the main spindle 2. Along with this gear 15 is placed a bevel or miter gear 17 which engages with another bevel gear 18 carrying a sleeve 19 provided with a pocket or socket suitable to receive the cutter arbor 20 whose cutter 21 is mounted on the side of the arbor in the usual way.

A bearing 22 for the cutter arbor or rather for the socket piece or sleeve which receives such arbor is formed as an extension from the swinging frame and is preferably of the split or clamping type, being clamped by the bolts 23. To provide a suitable bearing proper the sleeve 19 is embraced by a split bushing 24 having a flange 25 at one end, a washer 26 being arranged at the other end. A screw threaded collar 27 screws upon the screw threaded end of the sleeve 19 and is held in position thereon by set screws 28 which force one or more threaded keepers 29 against the threads of such sleeve. Radial holes 30 are provided in this collar for a spanner wrench. The cutter arbor is drawn up tight into the sleeve by the end nut 31. The other bearing 32 which may also be of the split type is preferably removable from the swinging frame. Both the frame and bearings are recessed as shown respectively at 33 and 34, so as to receive a tongue 35 held to the frame by screws 36. The frame has two longitudinal slots 37 entering from the end and receiving the bolts 38 which serve to screw this bearing to the swinging frame. A split bushing 39 is arranged in the bearing and surrounds one of the distance collars or sleeves 40 on the cutter arbor. A nut 41 is adjusted to screw on the end of the cutter arbor.

As is apparent from the above description the swinging frame is capable of swinging a complete circle around the main spindle and the main gear and of being adjusted to any desired angle with relation to the work, which as shown consists of gear blanks 42. If it is now desired to cut a spiral gear with the teeth say 45 degrees angle the cutter arbor already described is simply set at an angle of 45 degrees, right hand or left hand from the vertical line through the driving spindle, and the blank in which the teeth are to be cut is then brought up against the cutter and fitted with the other universal spiral gear. The gears are thus cut down on the side instead of on the top as heretofore whereby the usual taper support is done away with as well as the extra cutter arbor and long supporting arm. Furthermore my new arrangement permits of the table being placed at a right angle with the column whereby, I can get a longer mandrel of gear blanks in a machine of a given size than by the present method.

My machine or attachment is useful in cutting spiral gears and more particularly in making herring bone gears under my method in which a series of gear blanks 42 are arranged on a mandrel and spiral gears then cut thereon, of which the faces of two of such gears are reversed, accurately matched and then riveted together to form a herring bone gear.

I claim:

1. In a gear-cutting machine, the combination of a machine frame, a ring having a circular groove and an interior circular channel communicating therewith, a swinging frame carrying the cutter, bolts having heads movable in the channel and passing through said groove and into said swinging frame, and fastening bolts having heads engaged in said channel and entering the machine frame.

2. In a gear-cutting machine, the combination of a machine frame, a ring or collar secured thereto and having a circular groove and an interior circular channel communicating therewith, a swinging frame carrying the cutter, bolts having heads movable in the channel and passing through said groove and into said swinging frame, said channel being counterbored at intervals for fastening bolts and having an opening from the rear for the introduction of the first named bolts, and fastening bolts having heads engaged in the counter bores of the channel and entering the machine frame.

3. The combination with a machine frame, of a swinging frame thereon, having a recess 33 at its lower end, bearings 24 and 32 thereon, a cutter arbor supported by such bearings, means for rotating the arbor, the bearing 32 being split, and having a recess 34 corresponding to recess 33, a tongue 35 received by said recesses and bolts 38 securing the bearing 32 to the swinging frame.

4. The combination with a machine frame of a swinging frame thereon having end slots 37, bearings 24 and 32 thereon, a cutter arbor supported by such bearings, means for rotating the arbor, and bolts 38 passing through said slots and fastening the bearing 32 to the swinging frame.

5. In a gear cutting machine, the combination with a machine frame, of a swinging frame rotatably mounted thereon, two journals on said swinging frame supporting an arbor, and a cutter carried on said arbor intermediate of said journals, one of the journals having a slotted connection with said swinging frame, whereby it may be slipped from the end of the arbor to permit the insertion and removal of said cutter.

NIELS ANTON CHRISTENSEN.

Witnesses:
S. E. HIBBEN,
LOUIS B. ERWIN.